(12) United States Patent
Deng et al.

(10) Patent No.: US 11,588,249 B2
(45) Date of Patent: Feb. 21, 2023

(54) SIDELOBE SUPPRESSION IN MULTI-BEAM BASE STATION ANTENNAS

(71) Applicant: CommScope Technologies LLC, Hickory, NC (US)

(72) Inventors: Gangyi Deng, Allen, TX (US); Xiangyang Ai, Plano, TX (US); Gilberto Antonio Guerra Arias, Denton, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/268,498

(22) PCT Filed: Aug. 7, 2019

(86) PCT No.: PCT/US2019/045458
§ 371 (c)(1),
(2) Date: Feb. 15, 2021

(87) PCT Pub. No.: WO2020/040996
PCT Pub. Date: Feb. 27, 2020

(65) Prior Publication Data
US 2021/0242599 A1      Aug. 5, 2021

Related U.S. Application Data

(60) Provisional application No. 62/722,254, filed on Aug. 24, 2018.

(51) Int. Cl.
*H01Q 19/18*      (2006.01)
*H01Q 19/185*     (2006.01)
(Continued)

(52) U.S. Cl.
CPC .......... *H01Q 19/185* (2013.01); *H01Q 1/246* (2013.01); *H01Q 17/001* (2013.01); *H01Q 19/062* (2013.01); *H01Q 21/061* (2013.01)

(58) Field of Classification Search
None
See application file for complete search history.

(56) References Cited

U.S. PATENT DOCUMENTS 6,140,978 A  *  10/2000  Patenaude .............. H01Q 5/30
                                                 343/756
6,219,005 B1     4/2001   Szafranek
(Continued)

OTHER PUBLICATIONS

"International Search Report and Written Opinion corresponding to International Patent Application No. PCT/US2019/045458, dated Oct. 28, 2019".

*Primary Examiner* — Andrea Lindgren Baltzell
(74) *Attorney, Agent, or Firm* — Myers Bigel, P.A.

(57) ABSTRACT

A lensed multi-beam base station antenna may include a plurality of linear arrays of radiating elements, a plurality of reflectors, a sidelobe suppressor, and a lens. Each array may include a plurality of radiating elements (e.g., two or more radiating elements) that extends forwardly from a planar section of a respective reflector. The sidelobe suppressor may comprise radiofrequency (RF) absorber material that absorbs energy that is emitted by a first of the arrays and that is directed toward a reflector underneath a second of the arrays. The sidelobe suppressor may comprise a RF choke that reduces the RF energy emitted by a first of the arrays that is directed toward a reflector underneath a second of the arrays.

20 Claims, 15 Drawing Sheets

(51) Int. Cl.
    *H01Q 1/24*      (2006.01)
    *H01Q 17/00*     (2006.01)
    *H01Q 19/06*     (2006.01)
    *H01Q 21/06*     (2006.01)

(56) References Cited

U.S. PATENT DOCUMENTS

| | | | |
|---|---|---|---|
| 10,601,120 B2* | 3/2020 | Bisiules | H01Q 1/246 |
| 2013/0057445 A1 | 3/2013 | Simms et al. | |
| 2013/0300621 A1 | 11/2013 | Brandau et al. | |
| 2014/0218255 A1 | 8/2014 | Sanford et al. | |
| 2015/0091767 A1* | 4/2015 | Matitsine | H01Q 21/08 |
| | | | 343/753 |
| 2015/0280328 A1 | 10/2015 | Sanford et al. | |
| 2016/0087344 A1 | 3/2016 | Artemenko et al. | |

\* cited by examiner

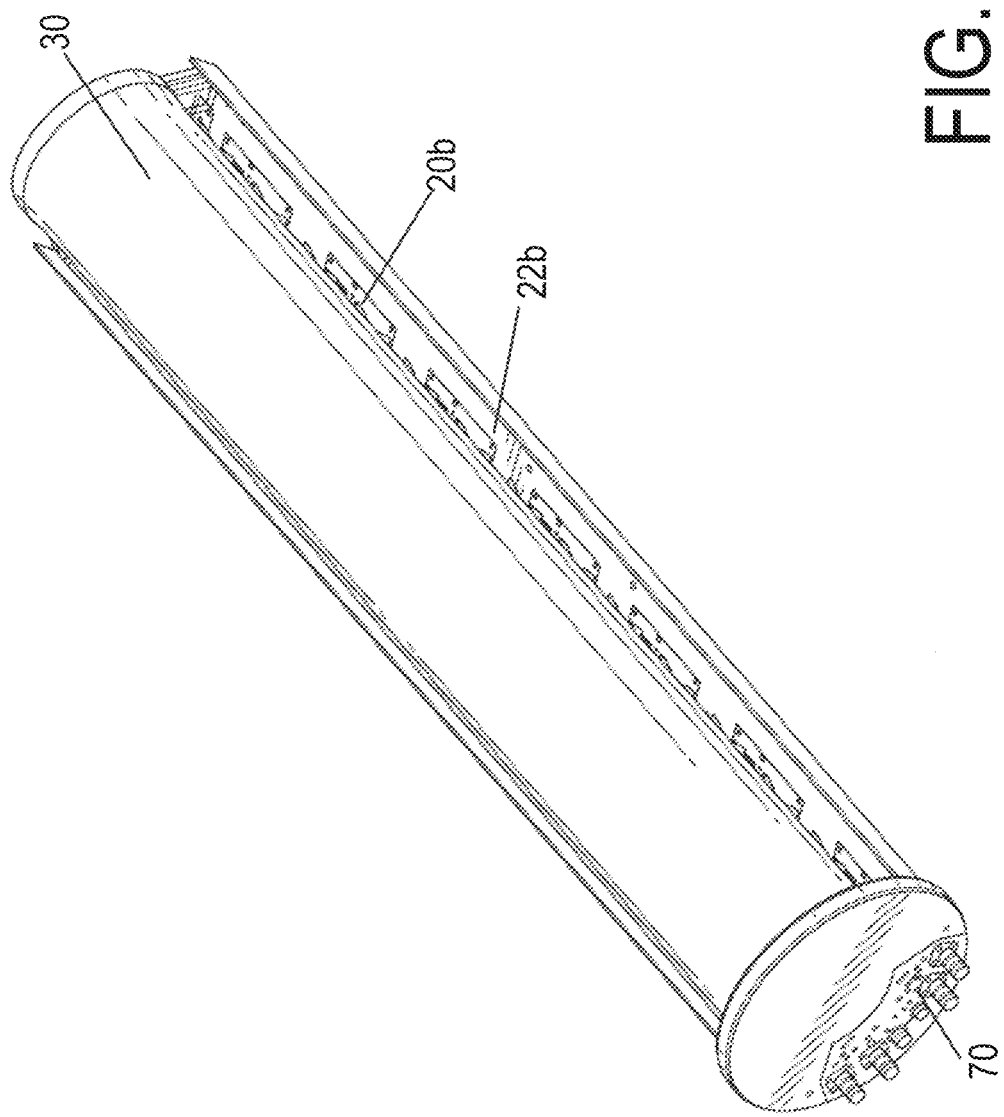

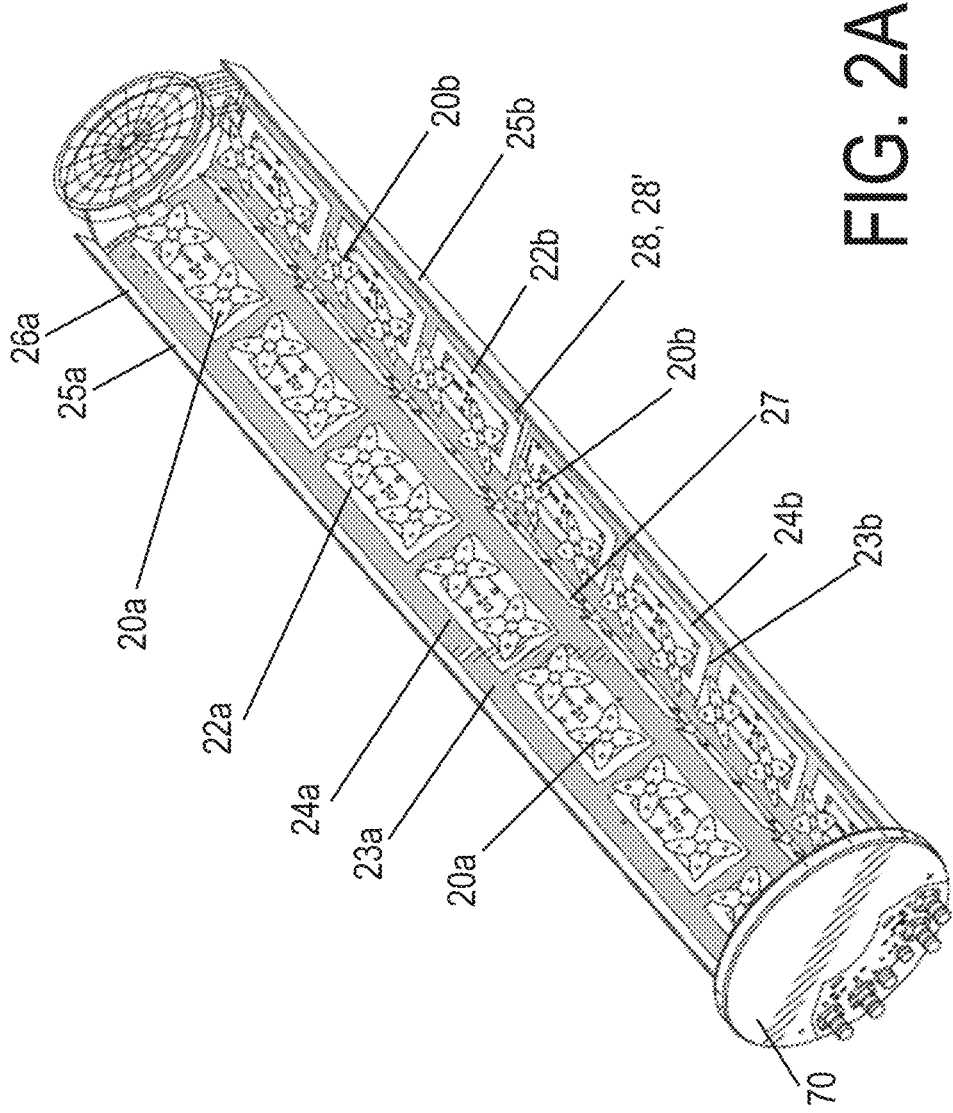

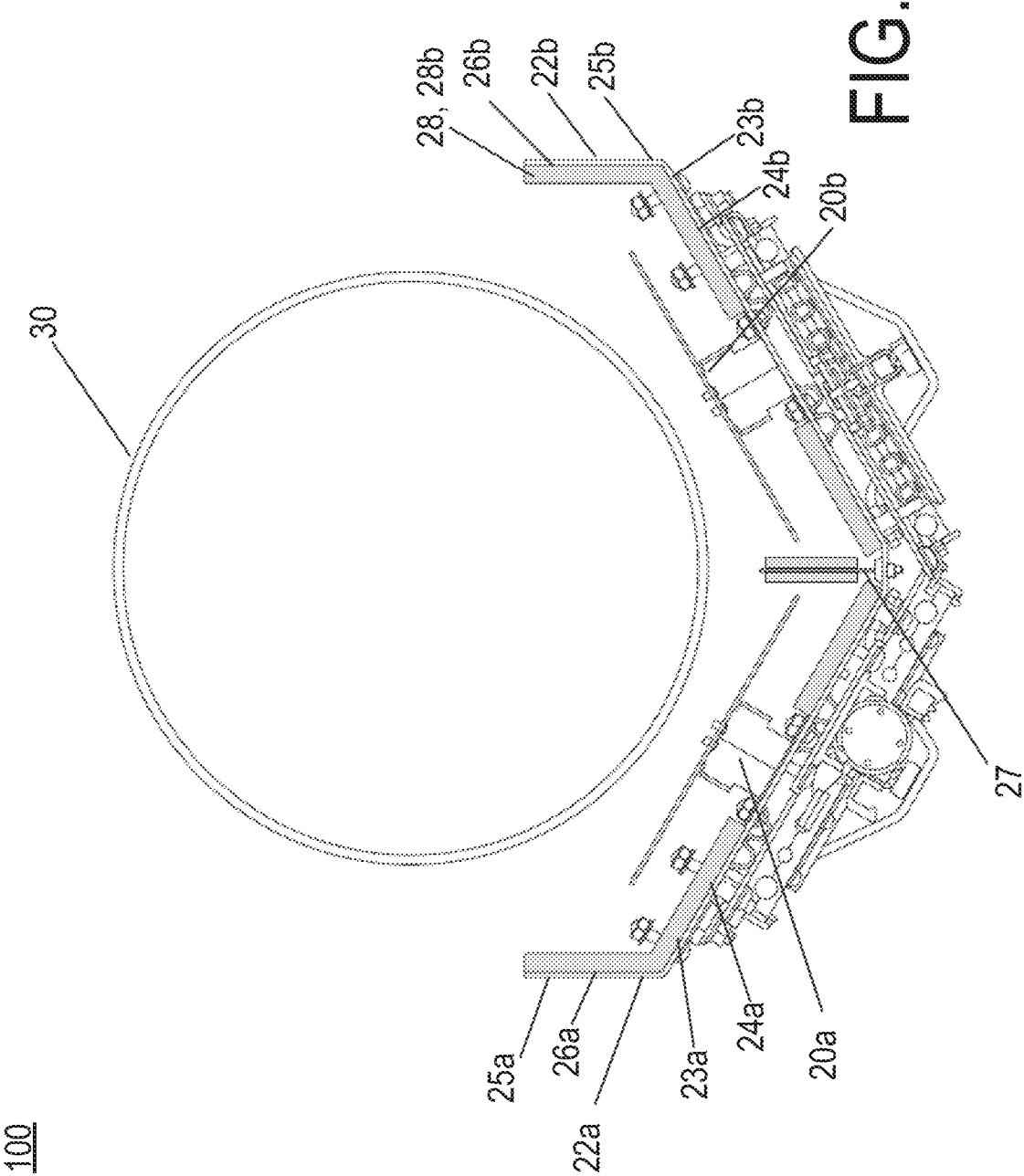

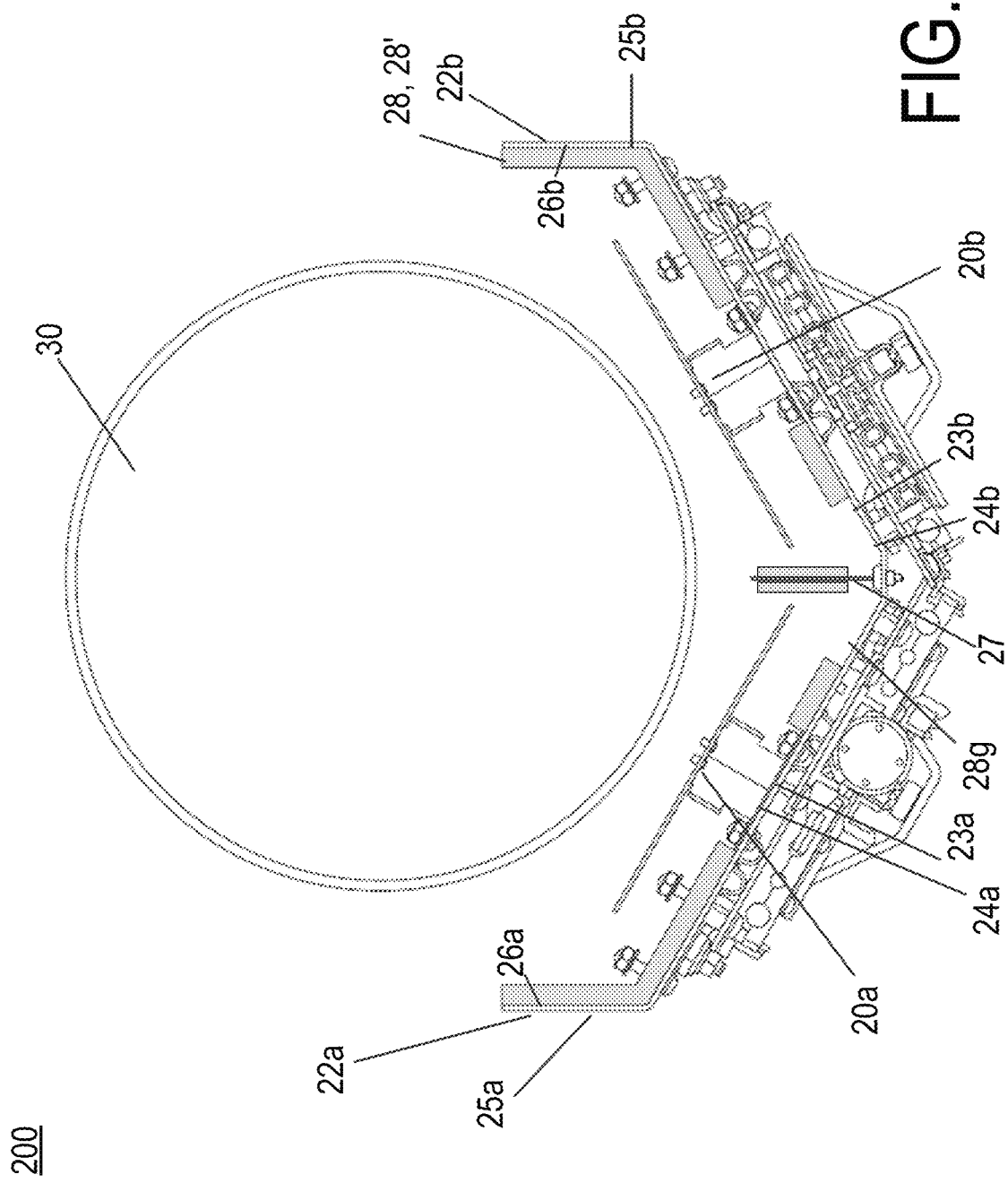

SIDELOBE SUPPRESSION IN MULTI-BEAM BASE STATION ANTENNAS

CROSS-REFERENCE TO RELATED APPLICATION

The present application is a 35 U.S.C. § 371 national stage application of PCT International Application No. PCT/US2019/045458, filed on Aug. 7, 2019, which claims priority to U.S. Provisional Application No. 62/722,254, filed on Aug. 24, 2018, the entire contents of each of which are incorporated by reference as if set forth herein.

TECHNICAL FIELD

The present disclosure generally relates to radio communications and, more particularly, to multi-beam base station antennas utilized in cellular communication systems.

BACKGROUND

In cellular communication systems, areas of communication coverage are mapped into cells. Each cell is provided with one or more antennas configured to provide two-way radiofrequency (RF) communication with mobile subscribers geographically positioned within the cell. Cells may be further divided into sectors, and multiple antennas may be utilized, with each of the multiple antennas configured to serve a sector (e.g., a different sector) of the cell. Antennas servicing a cell or a sector thereof are commonly located on a tower or other elevated structure, with each antenna directed away from the tower or structure to provide service within a respective cell or sector.

One common wireless communication network plan involves dividing a cell into three sectors. In such a configuration, a given base station antenna serves a 120° sector. Typically, a 65° Half Power Beamwidth (HPBW) antenna provides coverage for a 120° sector. Three of these 120° sectors provide 360° coverage in the azimuth plane. Other sectorization schemes may also be employed. For example, six, nine, and twelve sector sites have been proposed. Six sector sites may involve six directional base station antennas, each having a 33° HPBW antenna serving a respective 60° sector.

Increasing the number of sectors increases system capacity because each antenna can service a smaller area, and hence have increased antenna gain, and because sectorization allows for frequency re-use. However, dividing a coverage area into smaller sectors has drawbacks because antennas covering narrow sectors generally have more radiating elements that are spaced wider than antennas covering wider sectors. For example, a typical 33° HPBW antenna is generally two times wider than a common 65° HPBW antenna. Thus, costs and space requirements increase as a cell is divided into a greater number of sectors. Additionally, wider antennas may run afoul of local zoning ordinances and may have substantially higher wind loading, which may require sturdier (and more expensive) antenna towers.

SUMMARY

Aspects of the present disclosure provide apparatuses, systems, and methods that provide for sidelobe suppression in base station equipment, including base station equipment having lensed base station antennas. For example, some general aspects of the present disclosure provide an antenna that includes a housing; at least one lens mounted within the housing; a first reflector; and a second reflector. The antenna also includes a first array of radiating elements extending forwardly from a front surface of a planar section of the first reflector. The antenna also includes a second array of radiating elements extending forwardly from a front surface of a planar section of the second reflector. A first plane including the front surface of the planar section of the first reflector and a second plane including the front surface of the planar section of the second reflector intersect at an oblique angle. The antenna also includes a sidelobe suppressor configured to reduce first radio frequency (RF) energy emitted by the first array of radiating elements and reflected by the second reflector.

Some general aspects of the present disclosure provide an antenna that includes a housing. At least one lens is mounted within the housing. The antenna also includes a first reflector and a second reflector. A first array of radiating elements may extend forwardly from a front surface of a planar section of the first reflector. A second array of radiating elements may extend forwardly from a front surface of a planar section of the second reflector. A first plane including the front surface of the planar section of the first reflector and a second plane including the front surface of the planar section of the second reflector intersect at an oblique angle. The antenna also includes radio frequency (RF) absorber material that covers a portion of the front surface of the planar section of the first reflector and a portion of the front surface of the planar section of the second reflector. The front surfaces of the first and second reflectors face toward the at least one lens. The RF absorber material is configured to absorb first RF energy emitted by the first array of radiating elements that is directed toward the second reflector, and is also configured to absorb second RF energy emitted by the second array of radiating elements that is directed toward the first reflector.

Some general aspects of the present disclosure provide an antenna. The antenna includes at least one lens mounted within a housing, a first reflector, and a second reflector. The antenna also includes a first array of radiating elements that extend forwardly from a front surface of a planar section of the first reflector, and a second array of radiating elements that extend forwardly from a front surface of a planar section of the second reflector. A first plane including the front surface of the planar section of the first reflector and a second plane including the front surface of the planar section of the second reflector intersect at an oblique angle. The antenna also includes a radio frequency (RF) choke positioned between the planar section of the first reflector and the planar section of the second reflector. The RF choke is configured to reduce first RF energy emitted by the first array of radiating elements that is directed toward the second reflector, and second RF energy emitted by the second array of radiating elements that is directed toward the first reflector.

Other aspects provided by the present disclosure are discussed herein and are illustrated in the drawings.

BRIEF DESCRIPTION OF THE DRAWINGS

FIG. 1A is a perspective view of a lensed multi-beam base station antenna.

FIG. 2A is a perspective view of a lensed multi-beam base station antenna with the lens removed, according to some embodiments of the inventive concepts.

FIG. 2B is a cross-sectional view of the lensed multi-beam base station antenna of FIG. 2A.

FIG. 3 is a cross-sectional view of a lensed multi-beam base station antenna, according to some embodiments of the inventive concepts.

DETAILED DESCRIPTION

To address the increased costs and space requirements that result from dividing cells into a greater number of sectors, various solutions have been proposed. For example, base station antennas have been developed using beam forming networks (BFN) driving planar arrays of radiating elements, such as the Butler matrix. These BFNs can generate multiple antenna beams from the planar arrays of radiating elements, and each antenna beam may be used to serve a different sector. BFNs, however, have several potential disadvantages, including non-symmetrical beams, large grating lobes, and problems associated with port-to-port isolation, gain loss, and a narrow bandwidth.

Classes of multi-beam antennas based on a Luneberg lens have tried to address these issues. In this approach, multiple linear arrays are mounted behind the Luneberg lens, with each linear array pointed towards a different sector. The Luneberg lens is used to narrow the beamwidth of the antenna beams generated by the respective linear arrays to a beamwidth suitable for the sector size. The use of Luneberg lenses may generally avoid the problems associated with BFN approaches. Unfortunately, however, the cost of a Luneberg lens (a multi-layer lens having different dielectric in each layer) is high, the process of production may be complicated, and Luneberg lenses are quite large, which can raise cost, weight, and/or zoning issues. Antenna systems utilizing a Luneberg lens may also suffer from potential problems, including beam width stability over wide frequency bands and higher cross-polarization levels.

Figure 1B:
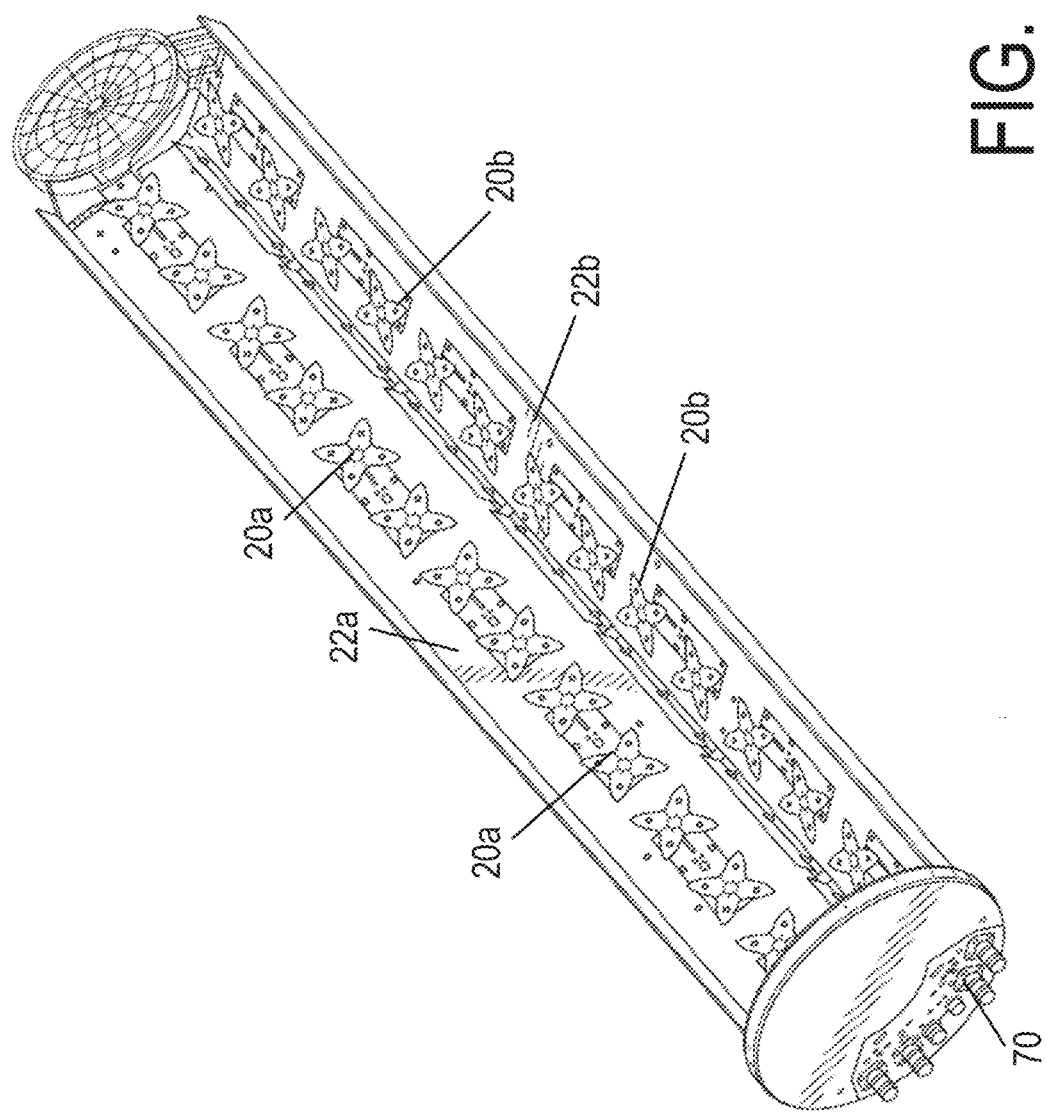
FIG. 1B is a perspective view of the lensed multi-beam base station antenna of FIG. 1A, with the lens removed for clarity.
Figure 1C:
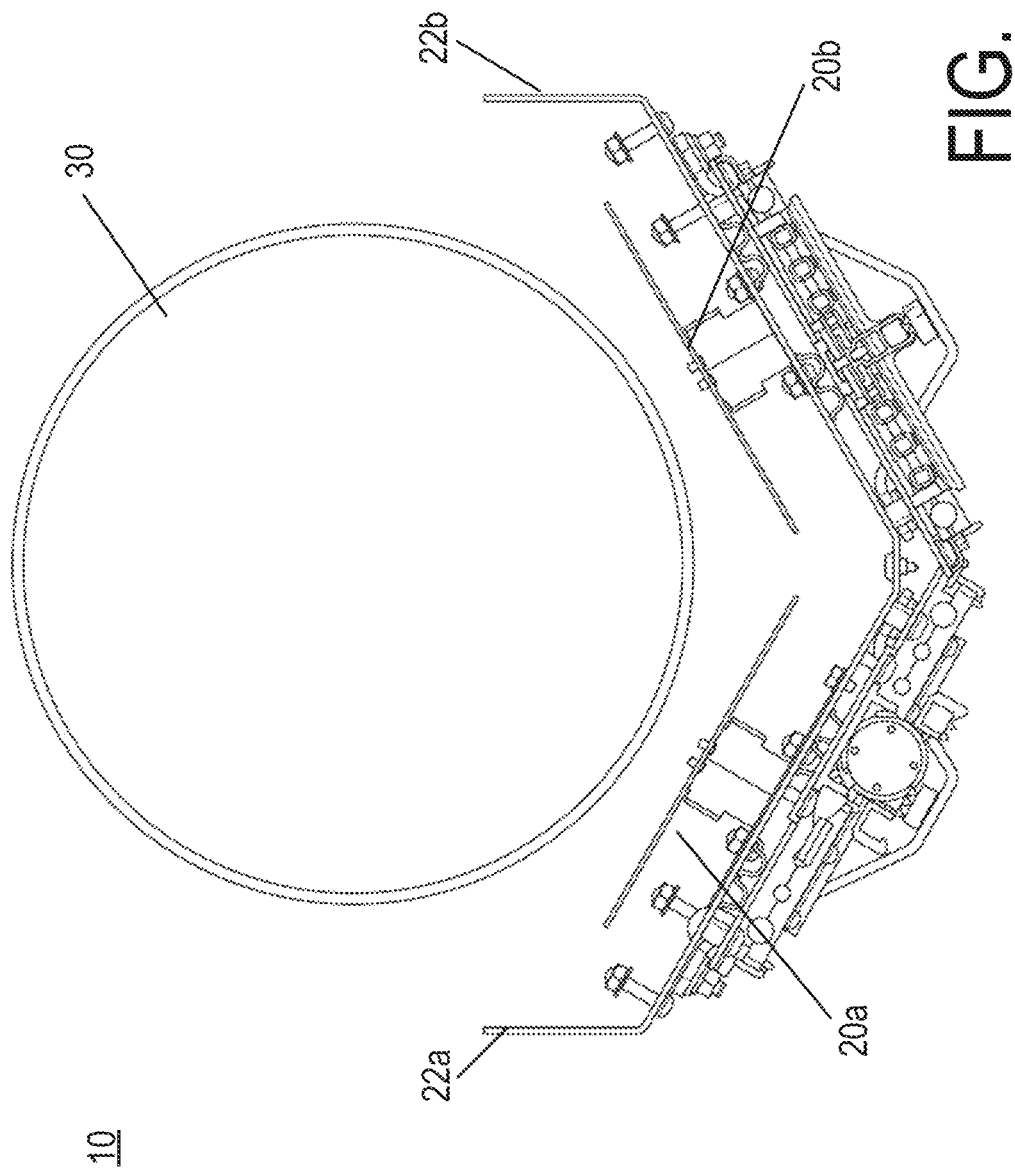
FIG. 1C is a cross-sectional view of the lensed multi-beam base station antenna of FIG. 1A.

Referring to the drawings, and initially to FIGS. 1A-C, a lensed multi-beam base station antenna 10 is shown in FIG. 1A. The lensed multi-beam base station antenna 10 is shown in FIG. 1B with the lens 30 removed, and a cross-sectional view of the lensed multi-beam base station antenna 10 is shown in FIG. 1C. The lensed multi-beam base station antenna 10 includes a plurality of linear arrays of radiating elements 20a, 20b (also referred to as "antenna arrays" or "arrays" herein) and a radio frequency lens 30. Each array 20 may include a plurality of radiating elements (e.g., two or more radiating elements). As shown in FIG. 1B, the radiating elements may be provided with feed board assemblies, such that two (or more) radiating elements have feed components in common. The lensed multi-beam base station antenna 10 may also include reflectors 22a, 22b that are positioned below the arrays of radiating elements. The reflectors 22a, 22b may be formed from a unitary component (e.g., a single reflector 22). In some aspects, the reflectors 22a, 22b may be formed such that the reflectors 22a and 22b meet at an oblique angle.

The lensed multi-beam base station 10 may include a plurality of ports (RF connectors) 70. In an example embodiment, the radiating elements may be dual-polarized radiating elements, and two ports may be provided for each linear array to supply RF signals at each polarization to each linear array 20a, 20b. However, it will be appreciated that different numbers of ports may be provided. For example, if the linear arrays 20a, 20b are diplexed so that each linear array transmits and receives RF signals in two different frequency bands, then the number of ports may be doubled. Herein, an azimuth plane of the lensed multi-beam base station antenna 10 is orthogonal to the longitudinal axis of radio frequency lens 30, and an elevation plane is in parallel to the longitudinal axis of lens 30.

In the embodiment shown in FIGS. 1A-C, the radio frequency lens 30 focuses the antenna beams generated by the arrays 20a and 20b in the azimuth plane. This changes, for example, half power beam widths of the arrays from approximately 65° to approximately 23°. In some embodiments, the number of beams of the lensed multi-beam base station antenna 10 is the same as the number of ports 70. For example, in FIGS. 1A-C, each array 20 has two ports corresponding to two polarizations (e.g., +45° polarization and −45° polarization). In some embodiments, the lens 30 may be a Luneberg lens; in some embodiments, the dielectric constant ("Dk") of the lens 30 may be homogenous, in contrast with Luneberg lenses which may have multiple layers with different Dk. Although a cylindrical lens 30 is shown in the figures, the present disclosure is not limited thereto. For example, one or more spherical lenses 30 or may be used.

Although the lensed multi-beam base station antenna 10 shown in FIGS. 1A-C provides advantages over previously known antennas, the inventors have recognized that further improvements and refinements of the lensed multi-beam base station antenna 10 are desirable to improve performance characteristics thereof.

For example, a first of the arrays of radiating elements (e.g., array 20a) may emit RF energy (e.g., radio waves) that reflects off of the reflector underneath the second of the arrays (e.g., reflector 22b). As the reflectors 22a, 22b are at an oblique angle from one another, the RF energy from the first array that reflects off the second reflector may not travel in an intended direction. For example, the reflected energy may not contribute to a main lobe or main beam of energy emitted from the first array 20a (e.g., roughly orthogonal with the reflector 22a) but instead may form or enhance a sidelobe of the radiation pattern of the array of radiating elements 20a. Put differently, the reflected energy or signal may create (or through additive interference, enhance) an unbalanced sidelobe in the azimuth plane of radiation of the first array 20a. The size of the oblique angle formed by the reflectors 22a, 22b is variable, and the amount of energy reflected into the sidelobe depends based on the size of the oblique angle. The oblique angle may be in the range of 100-170°. This reflected RF energy may also create or contribute to cross-polarization discrimination over sector that degrades the signal quality of the first array 20a. Cross-polarization discrimination over sector may refer to a lowest ratio between the co-polar component of a specific polarization (e.g., +45°) and the orthogonal cross-polar component (e.g., −45°) within the left and right sector boundaries, with respect to the projection of the mechanical boresight onto the azimuth cut.

To address these and other problems identified by the present inventors, the lensed multi-beam base station antenna 100 of FIGS. 2A and 2B is provided. The lensed multi-beam base station antenna 100 shown in FIGS. 2A-B is similar to the lensed multi-beam base station antenna 10 shown in FIGS. 1A-C, and like reference numerals refer to like components therein. However, the lensed multi-beam base station antenna 100 of FIGS. 2A-B further includes a sidelobe suppressor 28, which is implemented in the lensed multi-beam base station antenna 100 as an RF absorber material 28' that is disposed on the front surfaces 24a, 24b, of planar sections 23a, 23b of the respective reflectors 22a, 22b, as well as on the inner surfaces 26a, 26b, of the outer walls 25a, 25b of the reflectors 22a, 22b. Herein, "front surfaces" 24a, 24b, or "inner surfaces" 26a, 26b, of the reflectors 22a, 22b, may refer to surfaces of the reflectors 22a, 22b that face towards the lens 30 (not shown in FIGS. 2A-B) of the lensed multi-beam base station antenna 100, and "outer surfaces" or "bottom surfaces" may refer to surfaces of the reflectors 22a, 22b that face away from the lens 30 (not shown in FIGS. 2A-B) of the lensed multi-beam base station antenna 100. As best seen in FIG. 2A, the RF absorber material 28' surrounds the feed assemblies of each array 20a, 20b, although portions of the reflectors 22a, 22b immediately proximate to the feed assemblies (and below the radiating elements) may be uncovered by the RF absorber material 28'. In some embodiments, the RF absorber material 28' covers approximately 70-80% of the total surface area of each reflector 22a, 22b. In some embodiments, the RF absorber material 28' covers areas of the reflectors 22a, 22b other than areas adjacent to radiating elements in arrays 20a, 20b (and/or feed boards or feed assemblies associated with the radiating elements). Although not shown in FIGS. 2A-B, the arrays 20a, 20b, reflectors 22a, 22b, and sidelobe suppressor 28 (as well as other components discussed herein) may be positioned within a radome or housing that provides protection. For example, the lens 30 may be mounted in the radome or housing.

As is known, reflectors 22a, 22b are primarily used to redirect rearwardly directed radiation emitted by the arrays 20a, 20b forwardly, so that the redirected radiation may combine in phase with forwardly directed emitted radiation to increase the antenna gain. The RF absorber material 28' described herein with reference to the inventive concepts is thus counterintuitive, in that it provides a reduction in the gain of a first of the arrays 20a, 20b in order to achieve a reduction in a sidelobe of a second of the arrays 20a, 20b.

In some embodiments, the RF absorber material 28' may comprise a polyethylene foam base. Although the figures illustrate the RF absorber material 28' as having a uniform cross-section, the present disclosure is not limited thereto, and the RF absorber material 28' may have various cross-sectional features or dimensions. For example, the RF absorber material 28' may have repeating pyramidal features to improve the RF absorbing characteristics. The RF absorber material 28' may be configured to absorb electromagnetic energy over a wide band (e.g., 0.8 to 110 GHz), although specific ranges disclosed herein are examples and the present disclosure is not limited thereto.

The lensed multi-beam base station antenna 100 of FIGS. 2A-B may also include an inner wall 27, which may provide sidelobe suppression in addition to, or in the alternative to, the sidelobe suppressor 28. The vertical height of the inner wall 27 may be selected to provide some degree of sidelobe suppression while not adversely impacting performance of each of the arrays 20a, 20b. As shown in FIG. 2B, one or both surfaces of the inner wall 27 that face towards the arrays 20a, 20b may be partially or completely covered by RF absorber material 28', but the present disclosure is not limited thereto.

FIG. 3 shows a cross-section view of a lensed multi-beam base station antenna 200, in which the sidelobe suppressor 28 on either side of the inner wall 27 (e.g., on each reflector 22a, 22b) does not extend to the "vertex" of the reflector assembly, or put differently the longitudinal line where the reflectors 22a, 22b intersect or would intersect if extended. As such, a gap 28g may exist between the inner wall 27 and the innermost edge or surface of the sidelobe suppressor 28. It is recognized that the inner wall 27, when contributing to sidelobe suppression, may reduce the need for or desirability of RF absorber material 28' located proximate to the inner wall 27, and thus the overall amount of RF absorber material 28' used in the lensed multi-beam base station antenna 200 may be reduced. In some embodiments, the RF absorber material 28' may extend only 70-80% of the distance between an outer wall 25a, 25b and inner wall 27. The use of less RF absorber material 28' in the multi-beam base station antenna 200 as compared to the lensed multi-beam base station antenna 100 of FIGS. 2A and 2B may help increase the overall gain of each array 20a, 20b.

Figure 4A:
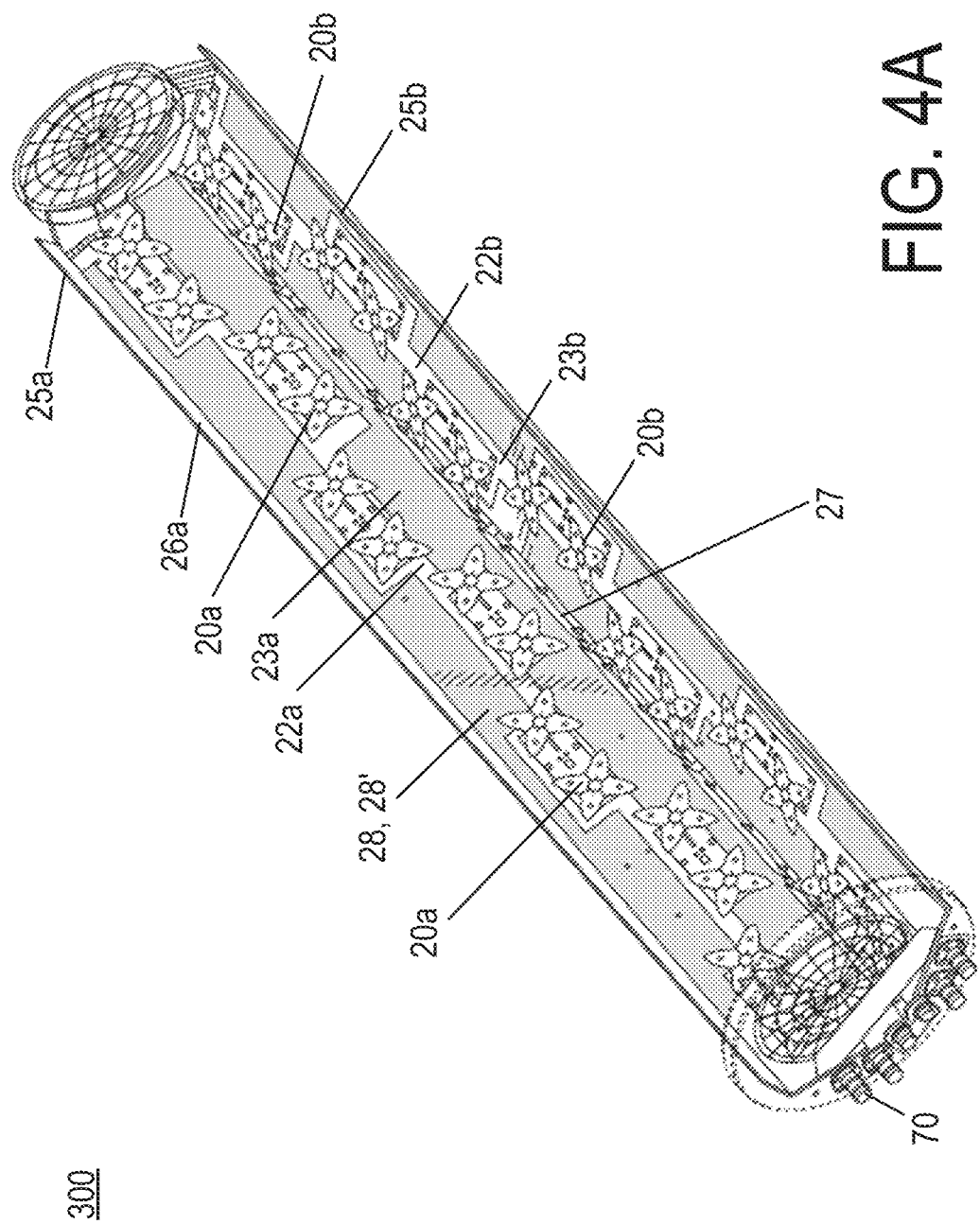
FIG. 4A is a perspective view of a lensed multi-beam base station antenna with the lens removed, according to some embodiments of the inventive concepts.
Figure 4B:
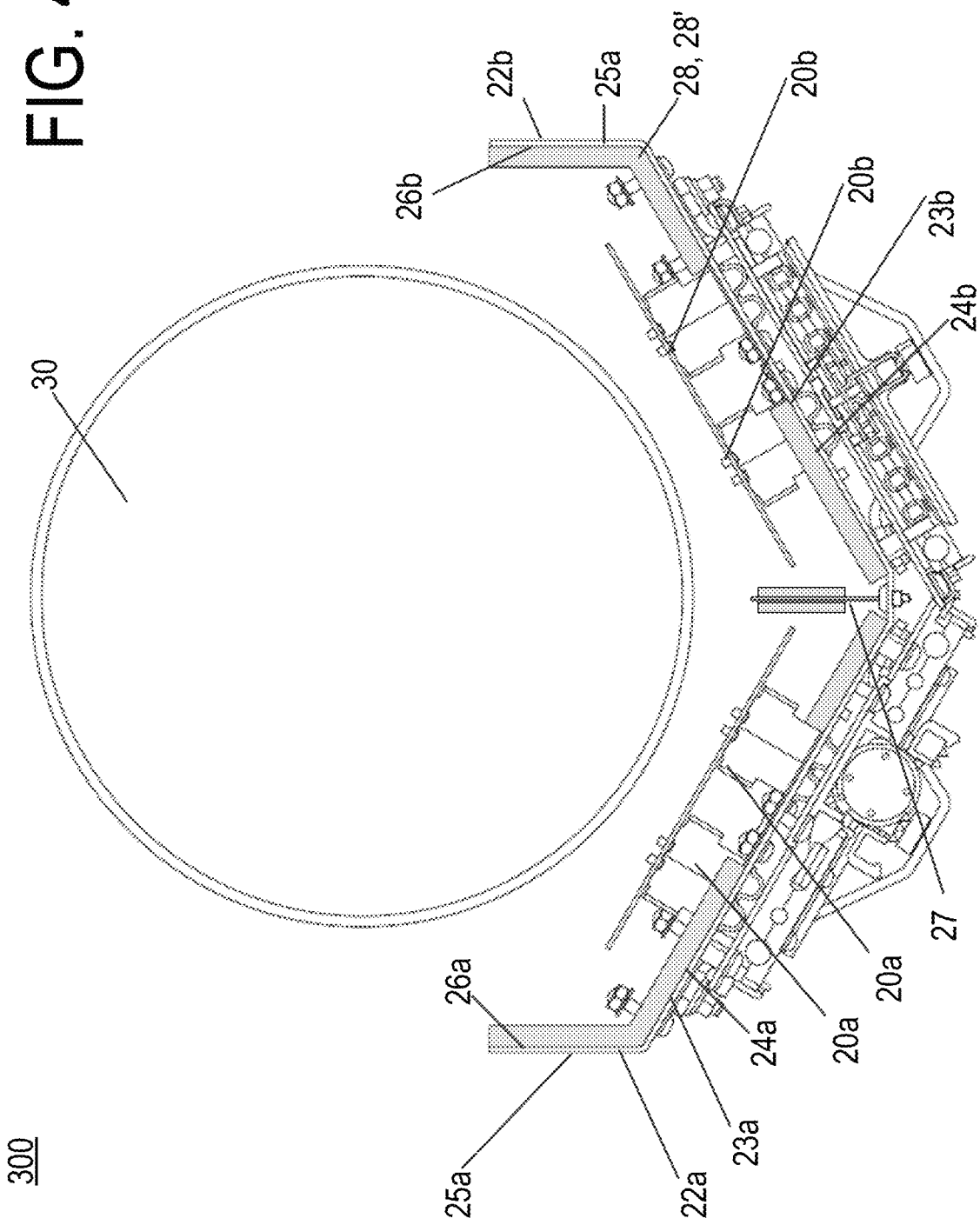
FIG. 4B is a cross-sectional view of the lensed multi-beam base station antenna of FIG. 4A.

FIGS. 4A and 4B show a perspective view and a cross-section view of a lensed multi-beam base station antenna 300, respectively, in which radiating elements of the arrays 20a, 20b are staggered. Put differently, where the radiating elements of the arrays 20a, 20b of the lensed multi-beam base station antennas 10, 100, and 200 illustrated in FIGS. 1A, 1B, 1C, 2A, 2B, and 3 are aligned along the longitudinal axis of the respective array 20a, 20b, the radiating elements of the arrays of the lensed multi-beam base station antenna 300 are staggered with respect to the longitudinal axes of the reflectors 22a, 22b. This may provide, for example, azimuth beam width stability. As shown, sidelobe suppressor 28 and inner wall 27 may be provided when such staggered radiating elements are present, and the RF absorber material 28' of the sidelobe suppressor 28 may be disposed on the reflectors 22a, 22b taking into account the stagger of the radiating elements.

Figure 5A:
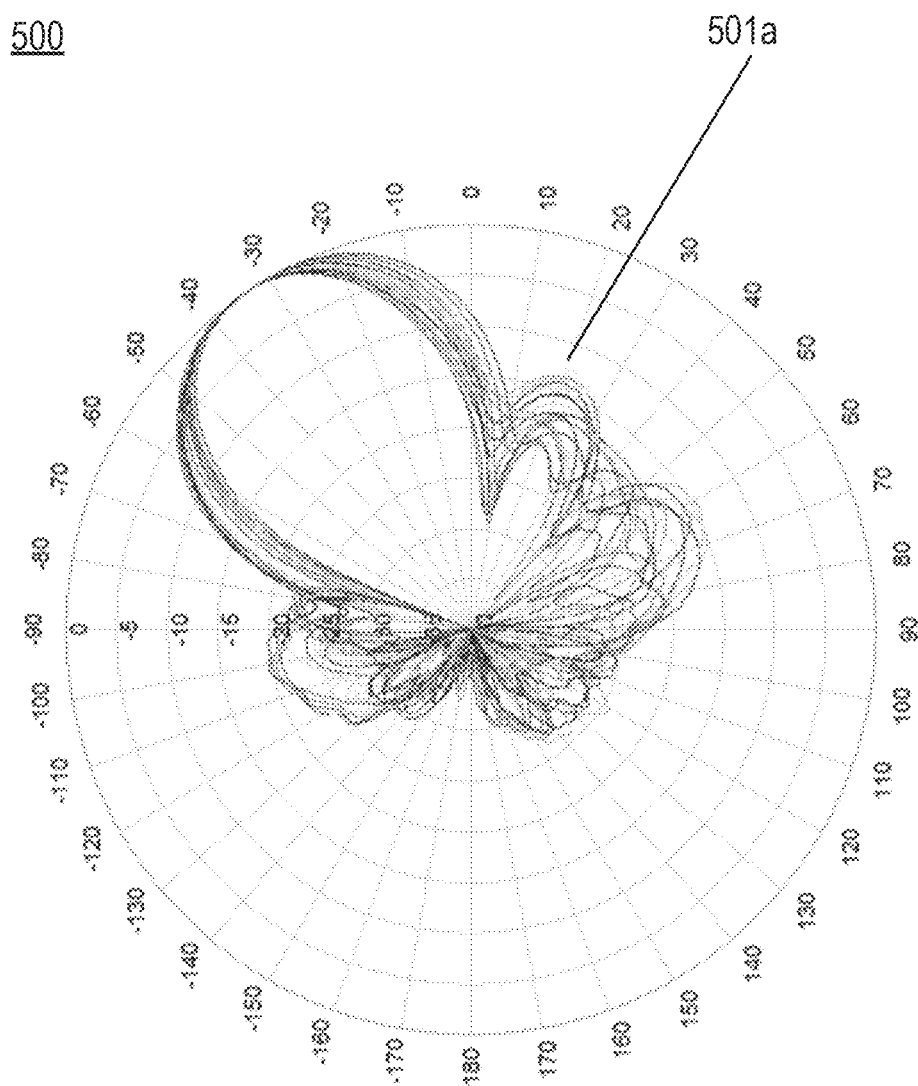
FIG. 5A is a polar radiation pattern of a lensed multi-beam base station antenna similar to that shown in FIGS. 1A-1C.
Figure 5B:
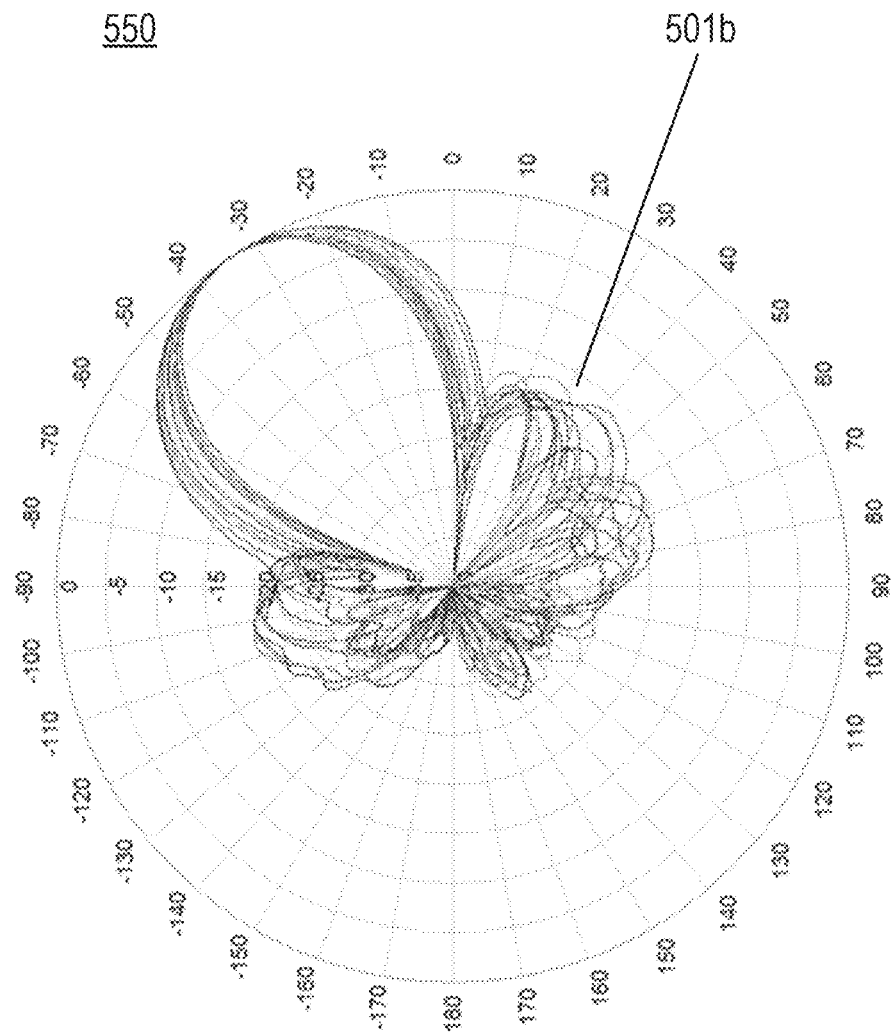
FIG. 5B is a polar radiation pattern of a lensed multi-beam base station antenna similar to that shown in FIGS. 2A and 2B.

FIGS. 5A and 5B show polar radiation patterns 500 and 550, respectively. Radiation pattern 500 shows the radiation pattern of a lensed multi-beam base station antenna similar to the lensed multi-beam base station antenna 10 of FIGS. 1A-C (i.e., without sidelobe suppressor 28), and radiation pattern 550 shows the radiation pattern of a lensed multi-beam base station antenna similar to the lensed multi-beam base station antenna 100 of FIGS. 2A-B (i.e., with sidelobe suppressor 28). The multiple curves of the polar radiation patterns 500 and 550 show the performance of the lensed multi-beam base station antenna at different frequencies within an operating frequency band. With reference to sidelobes 501a and 501b of FIGS. 5A and 5B, respectively, it can be seen that the maximum sidelobe 501b with the sidelobe suppressor present is under −15 dB in strength, whereas the maximum sidelobe 501a without the sidelobe suppressor present is greater than −15 dB in strength. The sidelobe suppressor 28 provides a reduction in the peak gain of the sidelobe by about 4 dB.

Figure 6A:
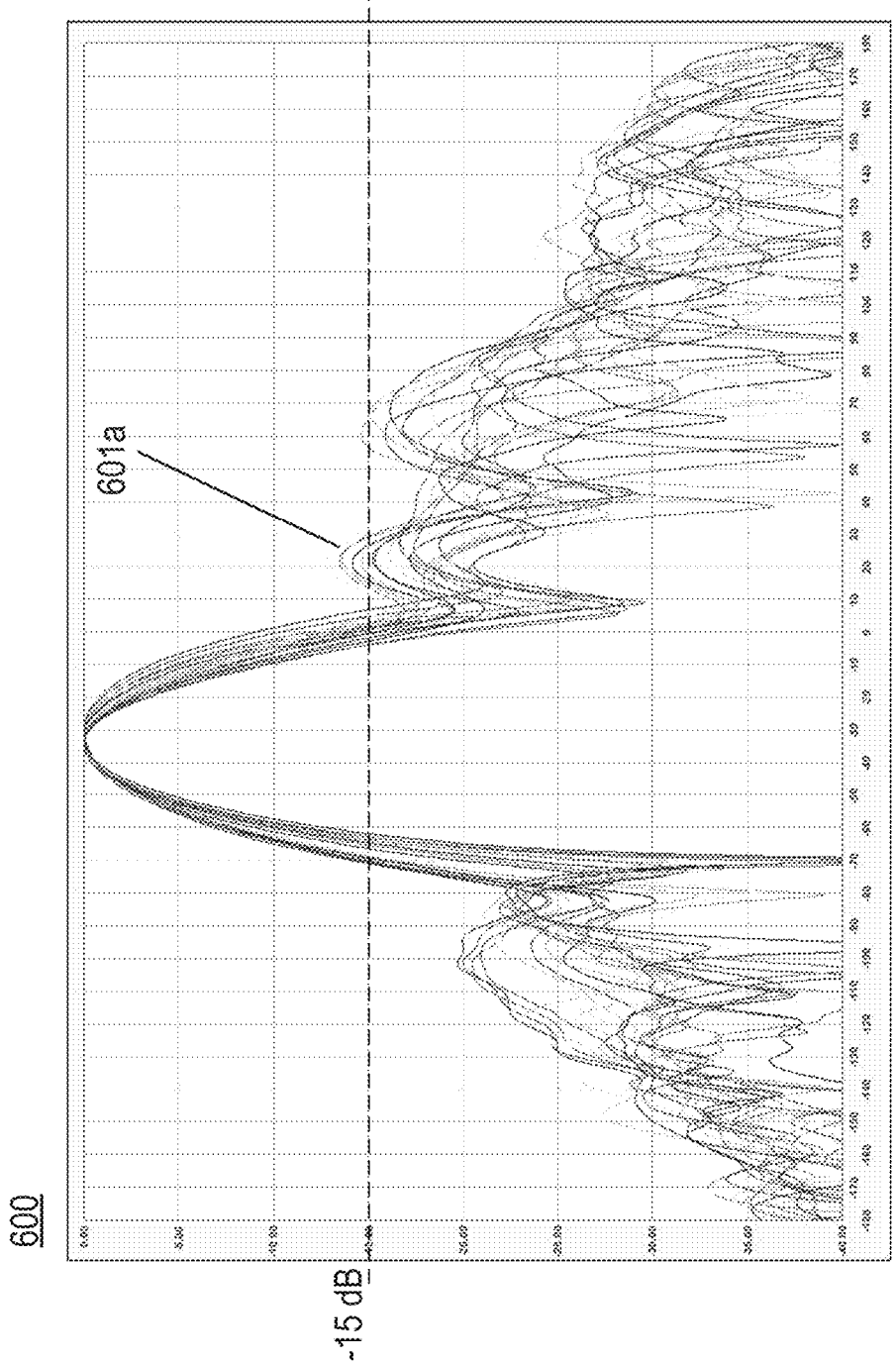
FIG. 6A is a Cartesian radiation pattern of a lensed multi-beam base station antenna similar to that shown in FIGS. 1A-1C.
Figure 6B:
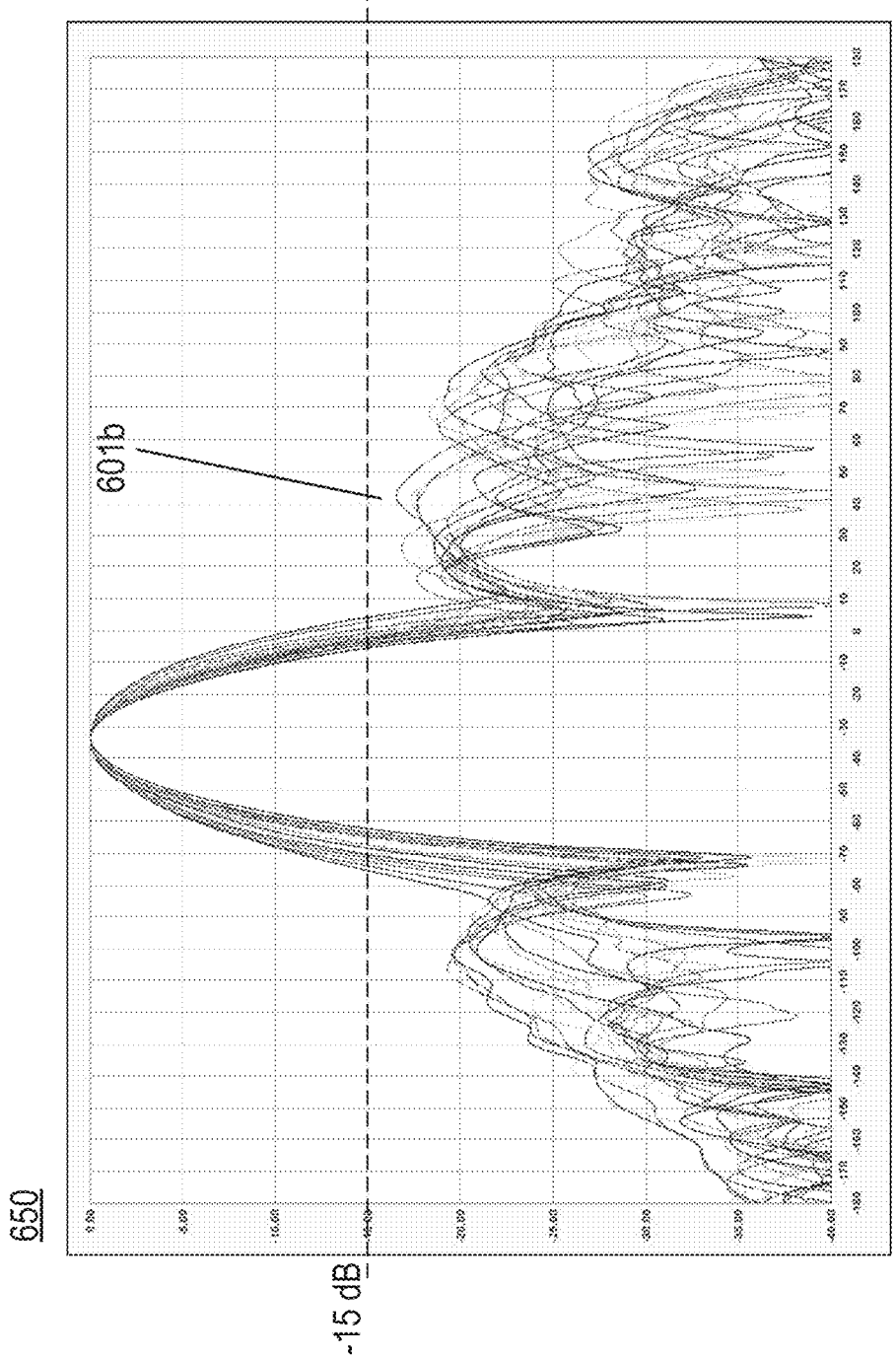
FIG. 6B is a Cartesian radiation pattern of a lensed multi-beam base station antenna similar to that shown in FIGS. 2A and 2B.

FIGS. 6A and 6B show Cartesian radiation patterns 600 and 650, respectively. Radiation pattern 600 shows the radiation pattern of a lensed multi-beam base station antenna similar to the lensed multi-beam base station antenna 10 of FIGS. 1A-C (i.e., without sidelobe suppressor 28), and radiation pattern 650 shows the radiation pattern of a lensed multi-beam base station antenna similar to the lensed multi-beam base station antenna 100 of FIGS. 2A-B (i.e., with sidelobe suppressor 28). The multiple curves of the Cartesian radiation patterns 600 and 650 show the performance of the lensed multi-beam base station antenna at different frequencies within an operating frequency band. With reference to sidelobes 601a and 601b of FIGS. 6A and 6B, respectively, it can be seen that the maximum sidelobe 601b with the sidelobe suppressor present is under −15 dB in strength, whereas the maximum sidelobe 601a without the sidelobe suppressor present is greater than −15 dB in strength.

Referring to FIGS. 1A-1C and FIGS. 5A and 6A, it can be seen that when a linear array 20b transmits an RF signal, the resulting sidelobes are asymmetric. In particular, as shown most clearly in FIG. 6A, the first sidelobe to the right of the main lobe has a peak that is about 13 dB below the peak of the main lobe, while the first sidelobe to the left of the main lobe has a peak that is about 20 dB below the peak of the main lobe. This asymmetry occurs because some of the radiation emitted by linear array 20b impinges onto the planar section 23a of reflector 22a and/or onto the outer wall 25a of reflector 22a, and due to the oblique angle between reflectors 22a and 22b, a portion of this RF energy is reflected by planar section 23a and/or outer wall 25a back in directions where the reflected energy contributes to the first sidelobe that is to the right of the main lobe of the antenna beam generated by linear array 20b. The increased peak of the right sidelobe may result in unacceptably high interference into a neighboring sector. As shown in FIGS. 2A, 2B, 5B and 6B, when the RF absorber material 28' is added to reflector 22a, the symmetry of the sidelobes may be improved and the peak of the right sidelobe may be reduced by about 4 dB.

Figure 7A:
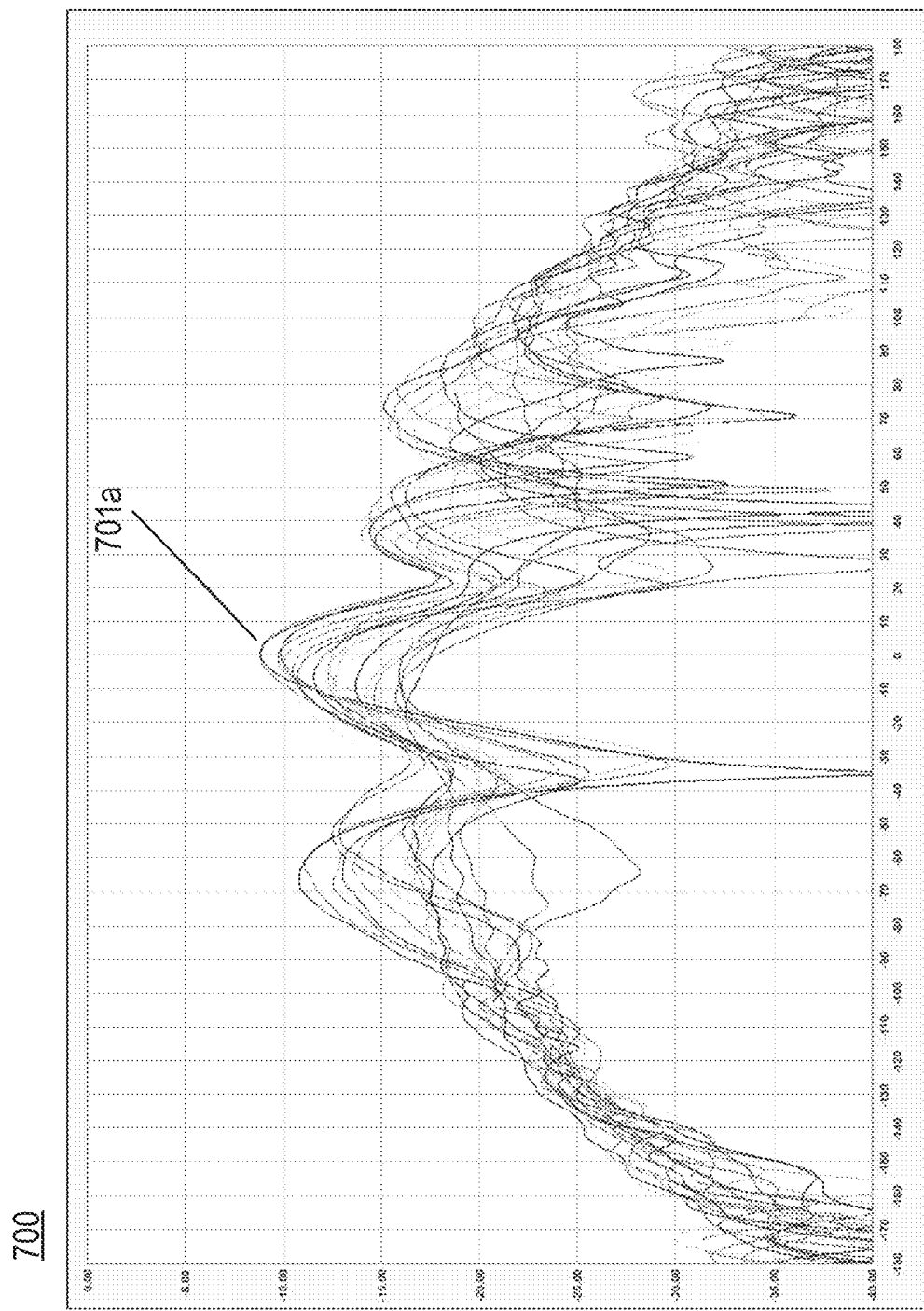
FIG. 7A is a Cartesian cross-polarization radiation pattern of a lensed multi-beam base station antenna similar to that shown in FIGS. 1A-1C.
Figure 7B:
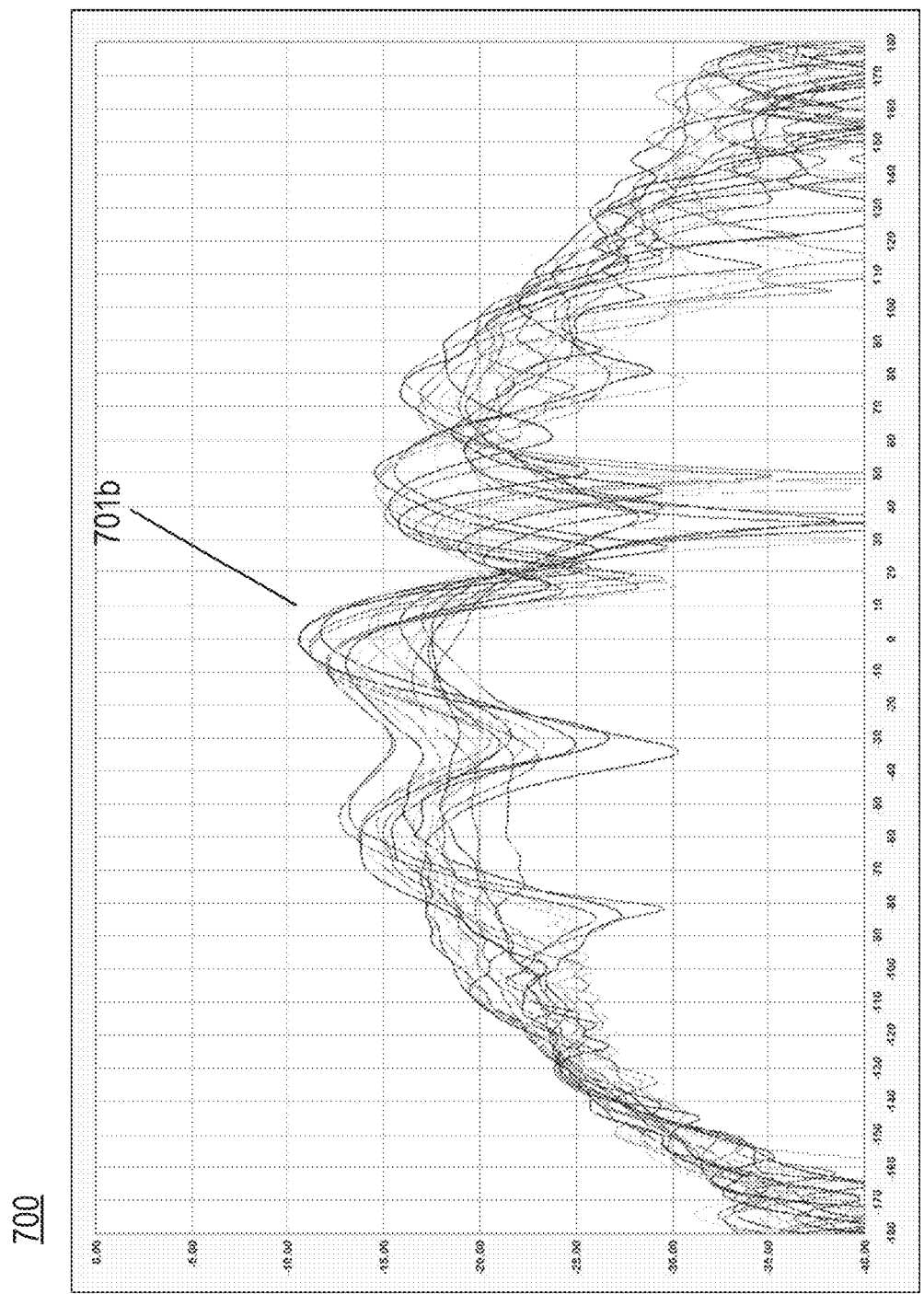
FIG. 7B is a Cartesian cross-polarization radiation pattern of a lensed multi-beam base station antenna similar to that shown in FIGS. 2A and 2B.
Figure 8A:
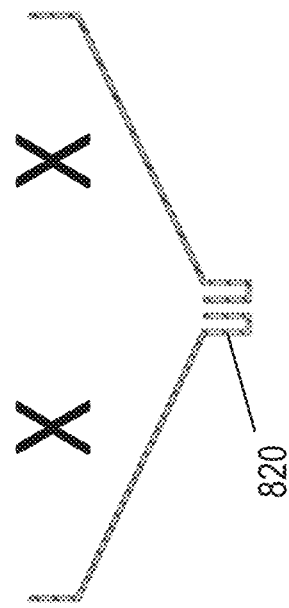
FIGS. 8A-8D are cross-sectional illustrations of RF chokes, according to some embodiments of the inventive concepts.
Figure 8B:
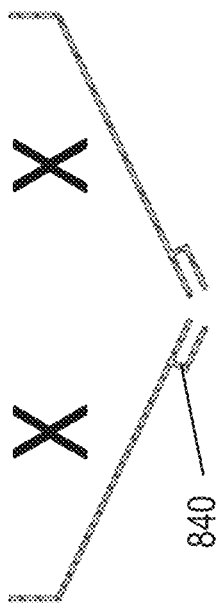
Figure 8C:
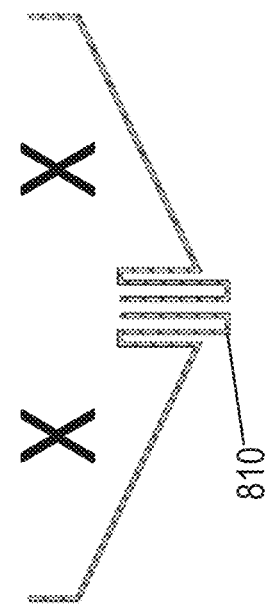
Figure 8D:
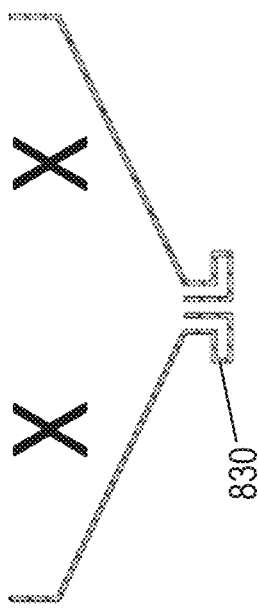

As discussed herein, the sidelobe suppressor may also improve cross-polarization interference. FIGS. 7A and 7B show Cartesian radiation patterns 700 and 750, respectively. Radiation pattern 700 shows the cross-polarization radiation pattern of a lensed multi-beam base station antenna similar to the lensed multi-beam base station antenna 10 of FIGS. 1A-C (i.e., without sidelobe suppressor 28), and radiation pattern 750 shows the cross-polarization radiation pattern of a lensed multi-beam base station antenna similar to the lensed multi-beam base station antenna 100 of FIGS. 2A-B (i.e., with sidelobe suppressor 28). The multiple curves of the Cartesian radiation patterns 700700700 and 750750750 show the performance of the lensed multi-beam base station antenna at different frequencies within an operating frequency band. The cross-polarization radiation pattern shows the amount by which RF energy transmitted at a first polarization (e.g., +45°) by the radiating elements of a linear array 20a or 20b is converted to RF energy having a second polarization (e.g., −45°). With reference to FIGS. 7A and 7B, respectively, it can be seen that the cross-polarization level 701b with the sidelobe suppressor 28 present is less than −10 dB, whereas the maximum lobe 701a without the sidelobe suppressor 28 present is greater than −10 dB.

Although the sidelobe suppressor 28 of lensed multi-beam base station antennas 100, 200, and 300 as described above may comprise an RF absorber material 28', the present disclosure is not limited thereto. As shown in FIGS. 8A-8D, the sidelobe suppressor 28 may instead be implemented as one of a plurality of RF chokes 810, 820, 830, and 840. Each of FIGS. 8A-8D illustrate a cross section in which a respective RF choke 810, 820, 830, or 840 is shown. The chokes 810, 820, 830, and 840 form channels that run the length of an array 20a, 20b. The RF chokes 810, 820, 830, 840 may be continuous, or may be a series of smaller chokes that run the length of the array 20a, 20b. An RF choke is a circuit element that allows some currents to pass, but which is designed to block or "choke" currents in certain frequency bands. Each antenna has at least two arrays of radiating elements (shown as "X" in each figure). Each RF choke 810, 820, 830, and 840 (i.e., the channels) may have an electrical path length (i.e., the sum of the lengths of each side and the bottom of the U-shape) that corresponds to a 180° phase shift at the center frequency of the frequency band at which one of the linear arrays of radiating elements of the antenna radiates RF energy. Consequently, RF currents that are carried outwardly on the reflectors 22a, 22b may pass down the inner side of the RF choke 810, 820, 830, and 840, along the bottom thereof and then back up the outer side of the RF choke 810, 820, 830, and 840. As the RF signal at the top of the outer side of the channel of the RF choke 810, 820, 830, and 840 is about 180° out-of-phase with the RF signal at the top of the inner side of the RF choke 810, 820, 830, and 840, these signals tend to cancel each other out. A sidelobe suppressor 28 may include one of the RF chokes 810, 820, 830, and 840, alone or in conjunction with the RF absorber material 28' discussed herein.

Some examples of embodiments of the inventive concepts provided herein have been described above with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. An antenna comprising:
   a housing;
   at least one lens mounted within the housing;
   a first reflector and a second reflector;
   a first array of radiating elements extending forwardly from a front surface of a planar section of the first reflector;
   a second array of radiating elements extending forwardly from a front surface of a planar section of the second reflector, wherein a first plane comprising the front surface of the planar section of the first reflector and a second plane comprising the front surface of the planar section of the second reflector intersect at an oblique angle; and
   a sidelobe suppressor configured to reduce first radio frequency (RF) energy emitted by the first array of radiating elements and reflected by the second reflector,
   wherein the sidelobe suppressor is on first portions of the front surface of the first reflector and/or the front surface of the second reflector, and
   wherein second portions of the front surface of the first reflector and/or the front surface of the second reflector below the radiating elements are uncovered by the sidelobe suppressor.

2. The antenna of claim 1, wherein the sidelobe suppressor comprises a RF absorber material covering a portion of the front surface of the planar section of the second reflector, and wherein the front surface of the planar section of the second reflector faces towards the at least one lens.

3. The antenna of claim 2, wherein the RF absorber material covers at least 70% of a surface area of the front surface of the planar section of the second reflector.

4. The antenna of claim 2, wherein the second reflector comprises an outer wall angled with respect to the planar section of the second reflector, wherein the RF absorber material covers an inner surface of the outer wall, and wherein the inner surface faces towards the at least one lens.

5. The antenna of claim 2, wherein the sidelobe suppressor further comprises a RF absorber material covering a portion of a front surface of the planar section of the first reflector, and wherein the front surface of the planar section of the first reflector faces towards the lens.

6. The antenna of claim 5, wherein the RF absorber material covers at least 70% of a surface area of the front surface of the first reflector.

7. The antenna of claim 2, further comprising an inner wall arranged between the planar section of the first reflector and the planar section of the second reflector.

8. The antenna of claim 7, wherein a RF absorber material at least partially covers a surface of the inner wall facing the first array of radiating elements or the second array of radiating elements.

9. The antenna of claim 7, wherein a gap exists between the inner wall and an innermost surface of the RF absorber material covering the portion of the front surface of the planar section of the second reflector.

10. The antenna of claim 1, wherein the sidelobe suppressor comprises a RF choke positioned between the planar section of the first reflector and the planar section of the second reflector.

11. The antenna of claim 10, wherein the RF choke has a length equal to a length of the first array of radiating elements.

12. The antenna of claim 1, wherein a unitary component comprises the first reflector and the second reflector.

13. An antenna comprising:
   a housing;
   at least one lens mounted within the housing;
   a first reflector and a second reflector;
   a first array of radiating elements mounted to and extending forwardly from a front surface of a planar section of the first reflector;
   a second array of radiating elements extending forwardly from a front surface of a planar section of the second reflector, wherein a first plane comprising the front surface of the planar section of the first reflector and a second plane comprising the front surface of the planar section of the second reflector intersect at an oblique angle; and
   radio frequency (RF) absorber material covering a portion of the front surface of the planar section of the first reflector and a portion of the front surface of the planar section of the second reflector, wherein the front surfaces of the planar sections of the first and second reflectors face toward the at least one lens, and wherein the RF absorber material is configured to absorb first RF energy emitted by the first array of radiating elements that is directed toward the second reflector and is configured to absorb second RF energy emitted by the second array of radiating elements that is directed toward the first reflector.

14. The antenna of claim 13, further comprising an inner wall positioned between the first reflector and the second reflector.

15. The antenna of claim 14, wherein the first reflector comprises an outer wall angled with respect to the planar section of the first reflector, wherein the second reflector comprises an outer wall angled with respect to the planar section of the second reflector, and wherein the outer wall of the first reflector and the outer wall of the second reflector extend in parallel to each other.

16. The antenna of claim 15, wherein the RF absorber material covers a portion of an inner surface of the outer wall of the first reflector and covers a portion of an inner surface of the outer wall of the second reflector, wherein the inner surface of the outer wall of the first reflector faces toward the at least one lens, and wherein the inner surface of the outer wall of the second reflector faces toward the at least one lens.

17. The antenna of claim 15, wherein the front surface of the planar section of the first reflector is completely covered by the RF absorber material along a distance from the inner wall to the outer wall of the first reflector.

18. The antenna of claim 14, wherein a portion of the front surface of the planar section of the first reflector that is proximate to the inner wall is uncovered by the RF absorber material.

19. An antenna comprising:
at least one lens mounted within a housing;
a first reflector and a second reflector;
a first array of radiating elements extending forwardly from a front surface of a planar section of the first reflector;
a second array of radiating elements extending forwardly from a front surface of a planar section of the second reflector, wherein a first plane comprising the front surface of the planar section of the first reflector and a second plane comprising the front surface of the planar section of the second reflector intersect at an oblique angle; and
a radio frequency (RF) choke positioned between the planar section of the first reflector and the planar section of the second reflector;
wherein the RF choke is configured to reduce first RF energy emitted by the first array of radiating elements that is directed toward the second reflector and reduce second RF energy emitted by the second array of radiating elements that is directed toward the first reflector.

20. The antenna of claim 19, wherein the first reflector, second reflector, and RF choke are formed as a unitary component.

* * * * *